April 27, 1954   W. RICHARDSON   2,676,549
POWER AND BRAKE APPLICATION SYSTEM FOR RAILWAY CARS
Original Filed June 4, 1948   2 Sheets-Sheet 1
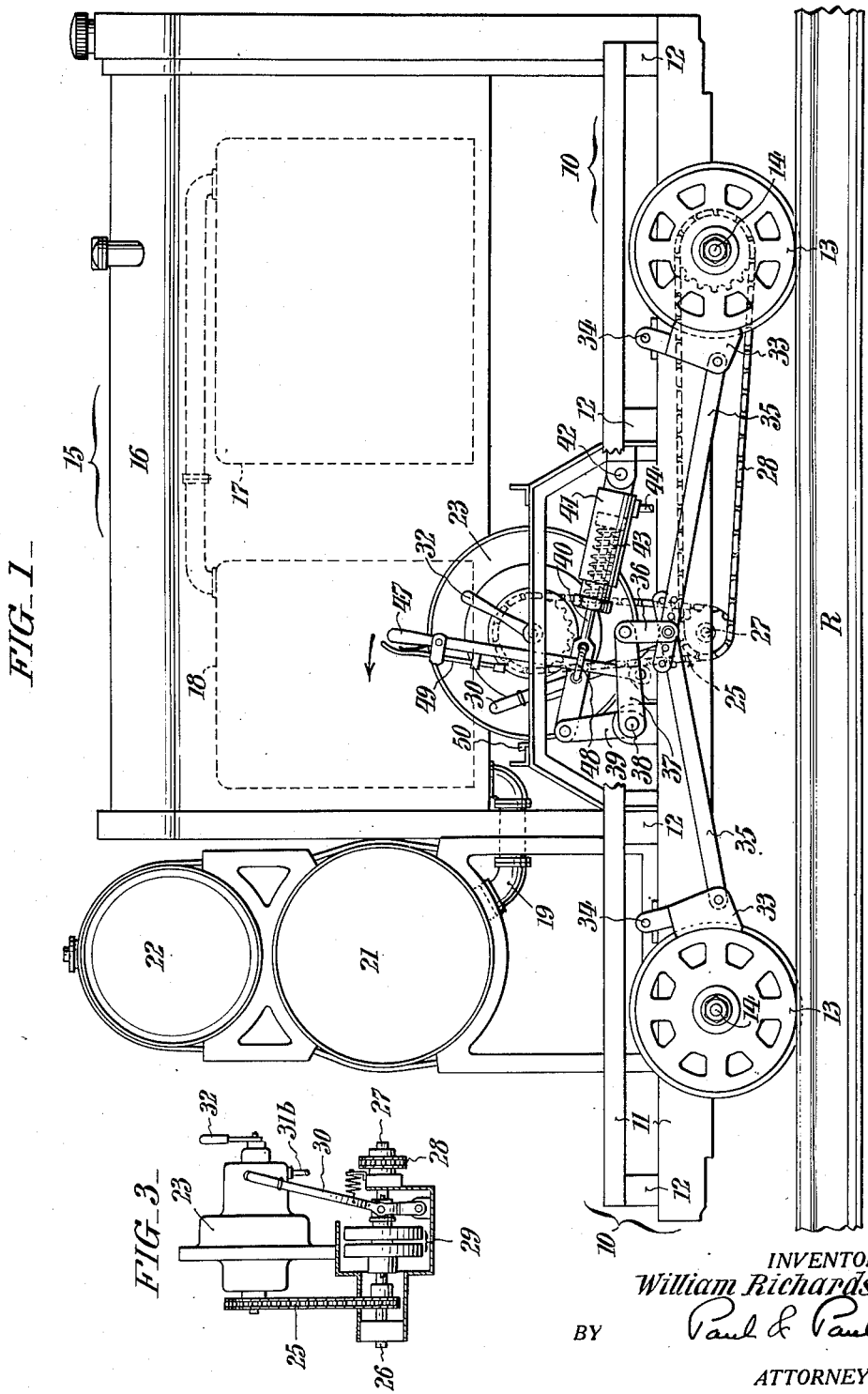
INVENTOR:
William Richardson,
BY Paul & Paul
ATTORNEYS.

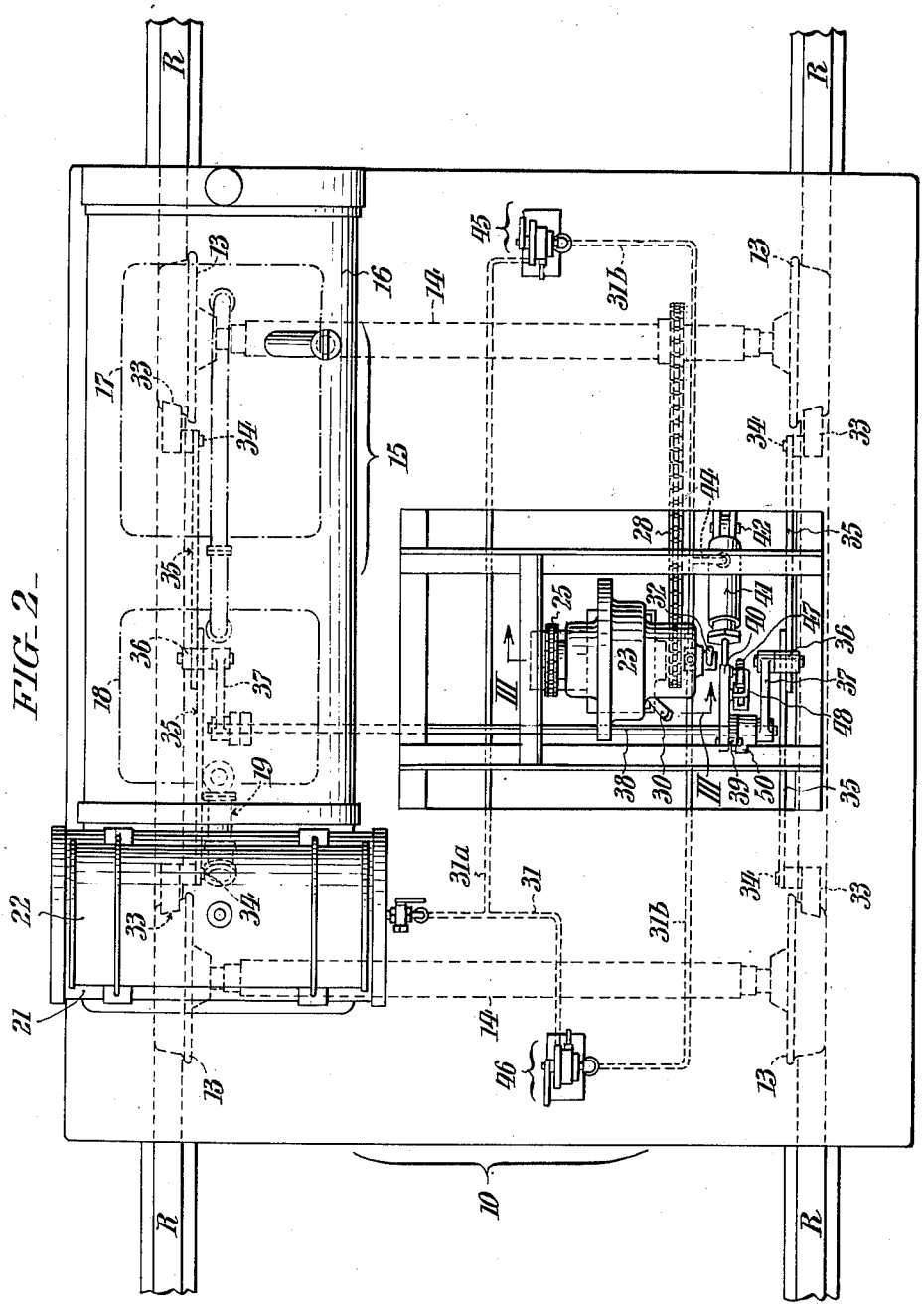

Patented Apr. 27, 1954

2,676,549

UNITED STATES PATENT OFFICE 2,676,549

POWER AND BRAKE APPLICATION SYSTEM FOR RAILWAY CARS

William Richardson, Pittsburgh, Pa.

Original application June 4, 1948, Serial No. 31,194. Divided and this application May 8, 1951, Serial No. 225,243

2 Claims. (Cl. 105—63)

This invention relates to power and brake application systems for wheeled land vehicles. More particularly, it has reference to power and brake application systems for railway cars of the type disclosed in U. S. Patent No. 2,602,694 granted to me on July 8, 1952 designed for use by track maintenance crews, the present application being a division of said patent.

The chief aim of the instant invention is to facilitate the operation of railway cars of the type referred to. This objective is realized in practice, as hereinafter more fully set forth, through provision of a simple and reliable mechanical system whereby the brakes are released concurrently with the application of wheel-driving power, and vice-versa, under manual control of an attendant on the car.

Other objects and attendant advantages will appear from the following detailed description of the attached drawings, wherein:

Fig. 1 is a view in side elevation of a railway car conveniently embodying my improved power and brake application system.

Fig. 2 shows the car in top plan; and

Fig. 3 is a fragmentary view in section taken as indicated by the angled arrows III—III in Fig. 2.

The car herein illustrated by way of example, is of a type intended more especially for use by track maintenance crews, the same having a horizontal platform 10, with side longitudinals 11 and connecting cross members 12, and two pairs of flanged supporting wheels 13 arranged to run on track rails R, R. Mounted on the platform 10 along one side thereof at one corner, is a power unit 15 which may be of any approved commercial form, comprising a housing 16 wherein is enclosed a water-cooled internal combustion engine and a direct driven air compressor, these are represented respectively by the dot and dash line rectangles 17 and 18 in Figs. 1 and 2. By way of a pipe line 19, compressed air is conducted from the compressor 18 to a storage tank 21 mounted on the platform 10 at the adjacent corner of the latter, immediately rearward of the power unit 15. Superposed upon the air tank 21 is a supply reservoir 22 for the fuel used to operate the internal combustion engine 17. For the propulsion of the car, I have shown an air motor 23 which, through a sprocket chain 25, is arranged to drive a power shaft composed of two axially-aligned sections 26 and 27, see Fig. 3, the latter of these sections being connected, in turn, to one of the wheel axles 14 by another sprocket chain 28. When the car is to be run on the track rails R, the section 27 of the power shaft is coupled with the section 26 by means of a clutch 29 arranged to be operated by a hand lever 30. Compressed air is conducted to the air motor 23 from the reservoir 21 through piping 31, 31a, 31b (Fig. 2) under control of one or the other of two interposed hand valves 45 and 46 respectively located at opposite ends of the truck. For reversing the motor 23, I have shown a manually operable valve with hand lever 32.

The brake mechanism includes shoes 33 which are pivotally hung from fixed brackets 34 adjacent the respective wheels 13. By means of toggle bars 35, the brake shoes 33 are connected to a link 36 suspended from a horizontal arm 37 on a transverse rock shaft 38. An upstanding arm 39, also secured to the rock shaft 38, is connected to the piston rod 40 of an air cylinder 41 which is movable about a fixed pivot 42. A spring 43, influential upon the piston of the cylinder 41, serves to normally keep the brake shoes 33 set as shown in Fig. 1. The brake shoes are automatically released concurrently with starting of the motor 23 under control of either of the valves 45 or 46 upon admission of compressed air into the front end of the cylinder 41 by way of a branch connection 44 (Fig. 2) extending from a pipe 31b. In order that the brakes may be manually released when necessary or desired, I have further provided a hand lever 47 which is loosely connected at 48 to the piston rod 40 of the cylinder 41. As shown, the hand lever 47 has a retractable latch rod 49 capable of being engaged with a fixed angle bar 50 on the truck frame 10 when said lever is swung leftward in Fig. 1, to hold the brake shoes released.

From the foregoing, it will be seen that, upon operation of either of the valves 45 or 46, compressed air will be supplied to the cylinder 41 to effect retraction of the brake shoes 33, and also to the motor 23 to drive the car, the direction of travel depending upon the setting of the reversing valve lever 32. If it is desired to shift the car for short distances at any time, the brakes can be released against the pressure of the spring 43 in cylinder 41 by moving the hand lever 47 leftward in Fig. 1. Moreover, upon disconnecting the clutch 29 by means of the hand lever 30, the motor 23 may be utilized as a power source for purposes other than driving the car.

Having thus described my invention, I claim:

1. Combined power drive and brake control means for a railway car having a platform and front and rear supporting truck wheels, a source of compressed air on the platform, a propelling motor operatively connected to one of the wheel axles, brake shoes pivotally hung adjacent the respective wheels, a transversely-arranged rock shaft journalled in bearings medially of the car platform, lift arms at opposite ends of the rock shaft, longitudinally-arranged links respectively connected at one end to the brake shoes, the links at each side of the car having their opposite ends pivotally connected to each other and to the corresponding lift arm on the rock shaft, a third arm affixed to the rock shaft, a brake actuating cylinder fulcrumed at its rear end for movement about a fixed axis on the car platform with its piston rod pivotally connected to said third arm, and spring means influential upon the linkage to keep the brakes normally set; said power drive and brake control means including a manually operable valve for controlling flow of compressed air to the motor to propel the car and admission at the same time of compressed air to the brake actuating cylinder to release the brakes.

2. The invention according to claim 1, wherein the motor is operatively connected to one section of a divided power shaft, and one wheel axle is operatively connected to the other section of the power shaft; and further including a clutch with the mating components thereof respectively connected to corresponding ends of the power shaft sections; and manual means for engaging and disengaging the clutch.

References Cited in the file of this patent

UNITED STATES PATENTS

| Number | Name | Date |
|--------|------|------|
| 141,272 | Hill | July 29, 1873 |
| 200,313 | Kirby | Feb. 12, 1878 |
| 742,722 | Nelson | Oct. 27, 1903 |
| 1,537,642 | Laffey | May 12, 1925 |
| 1,555,350 | Bolin | Sept. 29, 1925 |
| 1,805,814 | Durant | May 19, 1931 |
| 1,940,550 | Kazenmaier | Dec. 19, 1933 |
| 2,246,923 | Meunier | June 24, 1941 |
| 2,442,125 | Gunning | May 25, 1948 |
| 2,445,585 | Shaff | July 20, 1948 |